(12) United States Patent
Heap

(10) Patent No.: US 7,154,236 B1
(45) Date of Patent: Dec. 26, 2006

(54) CONTROL SYSTEM FOR HYBRID POWERTRAIN

(75) Inventor: Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/352,771

(22) Filed: Feb. 13, 2006

(51) Int. Cl.
*F16D 39/00* (2006.01)
*F16H 3/72* (2006.01)

(52) U.S. Cl. .................. 318/9; 180/65.2; 180/65.4

(58) Field of Classification Search .................. 318/9, 318/11–15; 180/54.1, 65.1–65.7, 337; 700/90, 700/95, 117
See application file for complete search history.

(56) References Cited

U.S. PATENT DOCUMENTS

| | | | | |
|---|---|---|---|---|
| 4,535,412 A | * | 8/1985 | Cederquist | 702/41 |
| 6,083,138 A | * | 7/2000 | Aoyama et al. | 477/5 |
| 6,962,545 B1 | * | 11/2005 | Larkin | 475/5 |
| 7,086,977 B1 | * | 8/2006 | Supina et al. | 475/5 |
| 7,090,613 B1 | * | 8/2006 | Heap et al. | 477/3 |
| 2005/0137042 A1 | * | 6/2005 | Schmidt et al. | 475/5 |

* cited by examiner

*Primary Examiner*—Bentsu Ro
(74) *Attorney, Agent, or Firm*—Christopher DeVries

(57) ABSTRACT

A method and apparatus for determining a preferred operating range for a plurality of torque-generative devices is provided. Each device is operable to provide motive torque to a transmission. The invention includes defining a first and a second operating range in a first operating space. The first operating range and the second operating range are mathematically transformed to a second operating space. The preferred operating range is defined in the second operating space based upon the transformed first operating range and the transformed second operating range. The first operating range is defined based upon torque output for each of the torque-generative devices. The second operating range is defined based upon output of an electrical energy storage device operable to provide electrical energy to each of the torque-generative devices.

20 Claims, 3 Drawing Sheets

CONTROL SYSTEM FOR HYBRID POWERTRAIN

TECHNICAL FIELD

This invention pertains generally to vehicle powertrain systems, and more specifically to a control system for a hybrid transmission system for a vehicle.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the preferable gear ratios for wide range operation.

One hybrid powertrain architecture comprises a two-mode, compound-split, electro-mechanical transmission which utilizes an input member for receiving power from a prime mover power source and an output member for delivering power from the transmission, typically to a vehicle driveline. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

Engineers implementing hybrid powertrain systems attempt to meet fuel economy and emissions targets by determining engine power from a required road-load power plus an additional quantity of engine power based on the energy storage system's (e.g. battery's) state-of-charge. Following determination of engine power, the engine's optimal fuel economy or optimal emissions map, or a combination thereof, may be used to select the engine's torque/speed operating point. The battery power used by the system is that which is required, in combination with the engine power, to meet the road-load power requirements and to compensate for power losses within the system.

Some known systems do not simultaneously optimize power flow from all the propulsion system components. Typically, only engine operation is optimized. Additional factors such as system mechanical and electrical losses and battery usage factors are often not used in selecting the overall system's preferred operating point. Systems which attempt to account for system mechanical and electrical losses and battery usage factors in optimizing power flow of all propulsion system components have faced a daunting task of simultaneously calculating the various power flows, consuming substantial amounts of on-board computer processing resources, both in terms of processing time and throughput, and algorithm complexity.

Therefore, there is a need to develop a hybrid powertrain control system which can optimize power flow from all the propulsion system components, accounting for losses, in a manner which effectively uses on-board computing resources.

SUMMARY OF THE INVENTION

It is therefore an object of this invention to provide a hybrid powertrain control system which optimizes power flow from all the propulsion system components, accounting for losses, in a manner which effectively uses on-board computing resources.

Thus, in accordance with the invention, an article of manufacture is provided, comprising a storage medium having a computer program encoded therein for effecting a method to determine a preferred operating range for a plurality of torque-generative devices. Each of the torque-generative devices is operable to provide motive torque to a torque transmission device. The program comprises code for defining a first and a second operating range in a first operating space. The first operating range and the second operating range are mathematically transformed to a second operating space. The preferred operating range is defined in the second operating space based upon the transformed first operating range and the transformed second operating range.

An aspect of the invention includes defining the first operating range based upon torque output for each of the torque-generative devices.

Another aspect of the invention includes defining the second operating range based upon output of an electrical energy storage device operable to provide electrical energy to each of the torque-generative devices.

Another aspect of the invention comprises defining the operating range based upon output of the electrical energy storage device and electrical energy system constraints, which further comprises limiting electrical energy transmission to the electrical energy storage system to limit charging of the electrical energy storage device, and to limit discharging of the electrical energy storage device.

Another aspect of the invention comprises transforming the first operating range and the second operating range to the second operating space, which includes linearly transforming the first operating range and the second operating range from a radial dimension to an XY dimension.

Another aspect of the invention comprises retransforming the defined preferred operating range to the first operating space.

Another aspect of the invention comprises determine the preferred operating range for the torque-generative devices during a cycle time less than about twelve milliseconds.

Another aspect of the invention includes the torque-generative devices comprising a pair of electrical motor/generators, and the torque transmission device comprises a two-mode compound split hybrid electro-mechanical transmission which is operable to transmit motive torque to a driveline of a vehicle.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
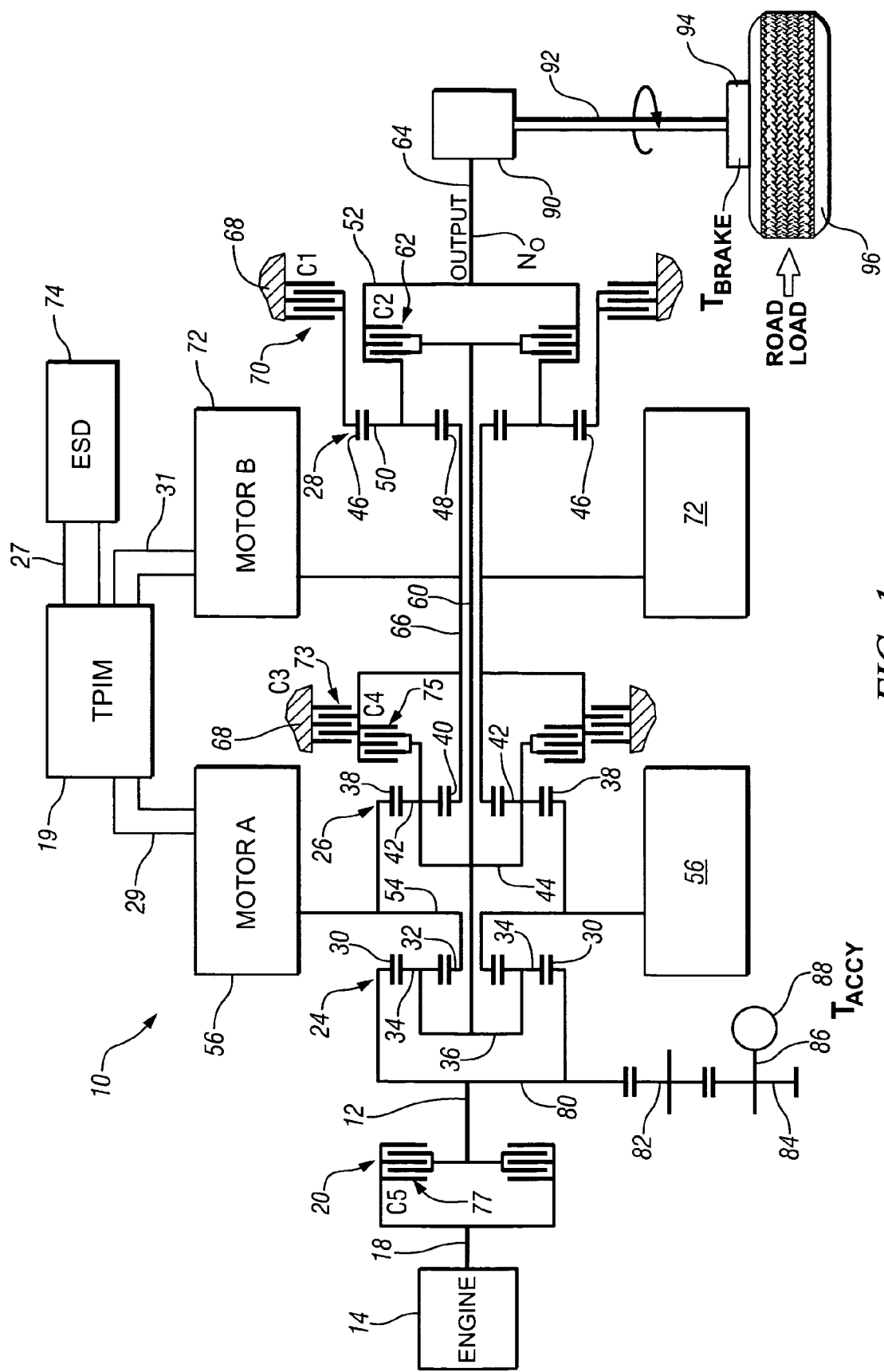
FIG. 1 is a schematic diagram of an exemplary powertrain, in accordance with the present invention.
Figure 2:
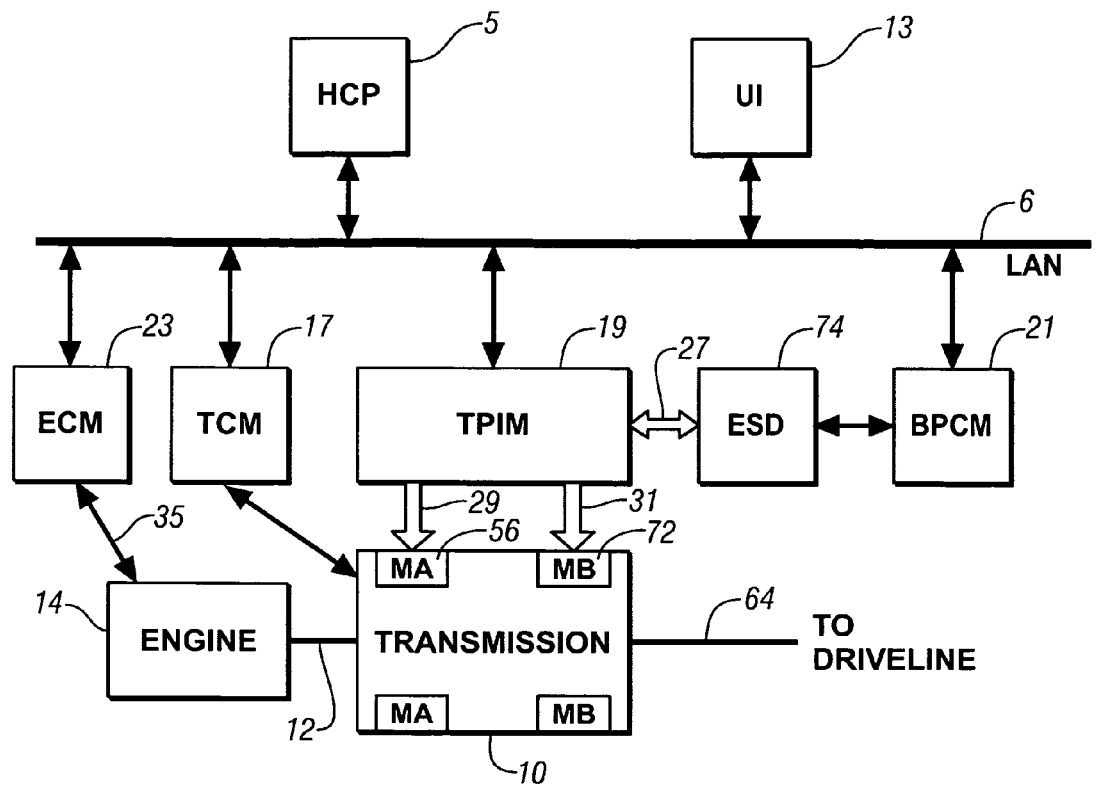
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled *Two-Mode, Compound-Split, Hybrid Electro-Mechanical Transmission having Four Fixed Ratios*, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N}$ for the various clutches C1, C2, C3, C4 of the hybrid transmission 10; and motor torque commands, $T_{A\_CMD}$ and $T_{B\_CMD}$, for the electrical Motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_E$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the Motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether Motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric Motors A and B, designated as $+/- N_A$, $+/- N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the Motors A and B 56, 72.

The various equations and operations described herein are preferably executed as algorithms in one or more of the controllers described hereinabove with reference to FIG. 2. In the present embodiment of the invention, it is an objective to determine a range of allowable operating points for Motor A 56 and Motor B 72. The allowable operating points are preferably described in terms of motor torques, $T_A$ and $T_B$, of electrical transmission 10 operative to provide motive torque in the hybrid powertrain system.

Figure 5:
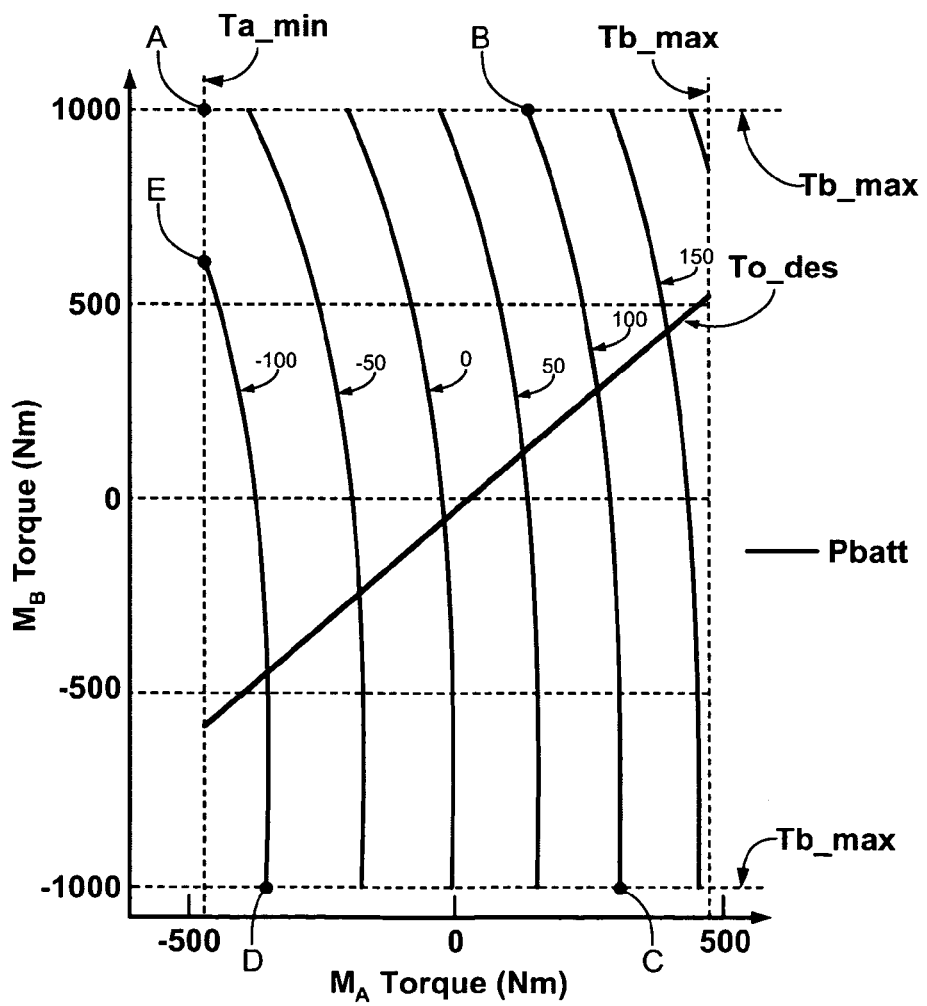

The invention comprises a method, stored and executed as one or more algorithms in one or more of the controllers of the control system, to determine a preferred operating range for the torque-generative devices, i.e. Motors A and B 56, 72, as executed in the exemplary system. The operation comprises defining a first operating range in a first operating space, and defining a second operating range in the first operating space. The first operating range and the second operating range are transformed to a second operating space. The preferred operating range is defined in the second operating space based upon the transformed first operating range and the transformed second operating range. The first operating range is preferably defined as a torque output of Motors A and B, and the second operating range is preferably defined as the electrical power output from the ESD in this embodiment. The first operating range and the second operating range are transformed to the second operating space, which is preferably in what is referred to as Tx/Ty space. The preferred operating range in the second operating space is based upon the transformed first operating range and the transformed second operating range. This is shown hereinafter, with reference now to FIG. 5 and the equations which follow.

Figure 3:
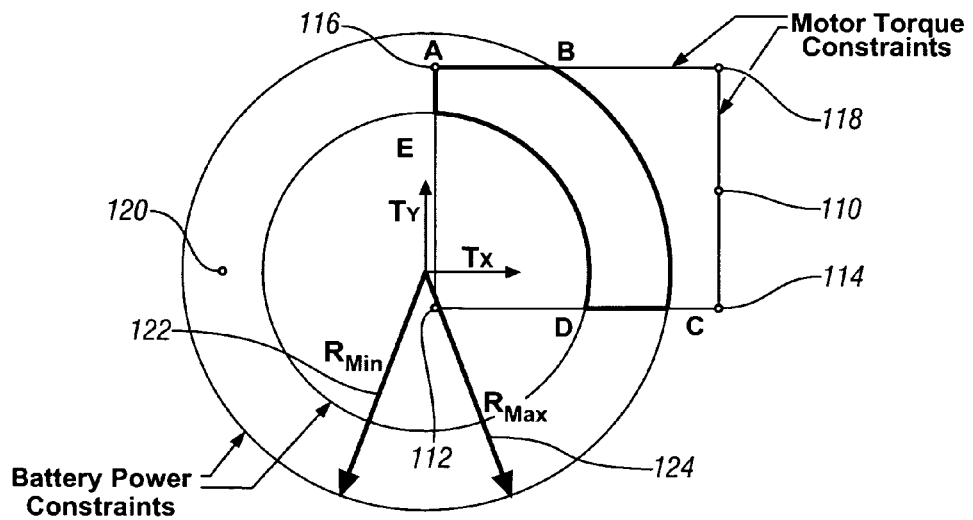
FIG. 3 is an analysis diagram, in accordance with the present invention; and, FIGS. 4 and 5 are representative data graphs, in accordance with the present invention.

The first operating range is defined as a torque output range for the Motor A 56 ($T_{A\_MAX}$, $T_{A\_MIN}$) and, a torque output range for the Motor B 72 ($T_{B\_MAX}$, $T_{B\_MIN}$). The first operating range thus comprises the torque operating range bounded by motor torque constraints $T_{A\_MAX}$, $T_{A\_MIN}$, $T_{B\_MAX}$, $T_{B\_MIN}$. With reference to FIG. 3, the first operating space 110 is shown, wherein values $T_{A\_MAX}$ 114, $T_{A\_MIN}$ 112, $T_{B\_MAX}$ 118, $T_{B\_MIN}$ 116 are plotted.

Figure 4:
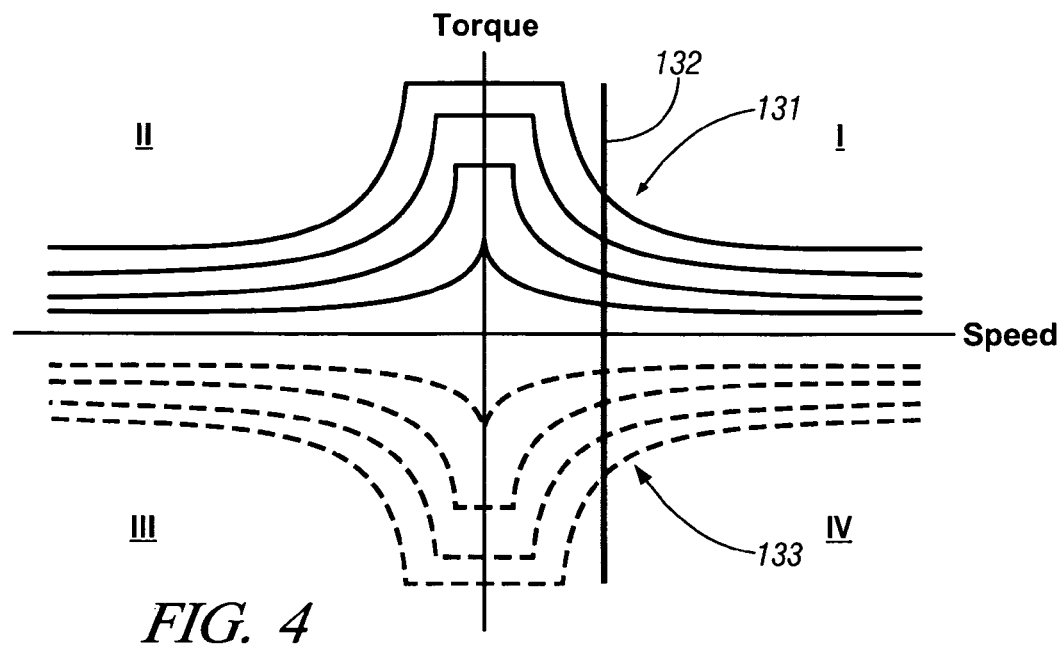

Minimum and maximum motor torques ($T_{A\_MAX}$, $T_{A\_MIN}$, $T_{B\_MAX}$, $T_{B\_MIN}$) within the present capabilities of the motors are preferably obtained from data sets stored in table form within data structures in the control system. Such data sets are provided for reference by the routine in pre-stored table format having been empirically derived from conventional dynamometer testing of the combined motor and power electronics (e.g. power inverter) at various temperature and voltage conditions. An exemplary representation of such characteristic motor torque vs. speed data is illustrated in FIG. 4 wherein minimum and maximum data for a given speed are represented by the line of constant speed 132 intersecting exemplary lines of constant temperature/voltage 131, 133. The tabulated data is referenced by the motor speeds ($N_A$, $N_B$), voltage and temperature.

While the motors are used in both motoring and generating modes—suggesting four-quadrants (identified as I, II, III, IV with reference to FIG. 4) of torque/speed data—two quadrant data collection is generally sufficient wherein the data collected in adjacent quadrants is merely reflected in the other quadrants not directly measured. In the present example, quadrants I and IV are shown with determined data 131 whereas quadrants III and IV are shown populated with data 133 reflected across the torque axis.

Exemplary data for motor torques is shown. Motor A torque, $T_A$, is plotted across the horizontal axis and Motor B torque, $T_B$, is plotted across the vertical axis. Boundaries are drawn as dotted lines corresponding to minimum and maximum Motor A torques ($T_{A\_MAX}$, $T_{A\_MIN}$), the minimum and maximum being with respect to motor capabilities at certain exemplary present operating conditions in $N_I$, $N_O$, the precise values of which are not required for the present exposition of the teachings to be gained from FIG. 5 and the present discussion. Similar boundaries are drawn as dotted lines corresponding to such minimum and maximum Motor B torques ($T_{B\_MAX}$, $T_{B\_MIN}$). The enclosed space represents a feasible solution space at present conditions for Motor A 56 and Motor B 72. Once again, the precise values used herein are not critical to the understanding to be gained from the present description and figure, but are provided for appropriate context and to reduce the teaching's abstraction.

A second operating range, comprising a torque output range, shown as 120 with reference to FIG. 3, is determinable based upon constraints of the electrical energy storage system 74. Calculation of battery power, $P_{BAT}$ is as follows, in Eq. 3:

$$P_{BAT} = P_{A,ELEC} + P_{B,ELEC} + P_{DC\_LOAD} \quad [3]$$

wherein:

$P_{A,ELEC}$ comprises electrical power from Motor A;
$P_{B,ELEC}$ comprises electrical power from Motor B; and,
$P_{DC\_LOAD}$ comprises known DC load, including accessory loads.

Substituting equations for $P_{A,ELEC}$ and $P_{B,ELEC}$, yields Eq. 4:

$$P_{BAT} = (P_{A,MECH} + P_{A,LOSS}) + (P_{B,MECH} + P_{B,LOSS}) + P_{DC\_LOAD}, \quad [4]$$

wherein:

$P_{A,MECH}$ comprises mechanical power from Motor A;
$P_{A,LOSS}$ comprises power losses from Motor A;
$P_{B,MECH}$ comprises mechanical power from Motor B; and,
$P_{B,LOSS}$ comprises power losses from Motor B.

Eq. 4 can be restated as Eq. 5, below, wherein speeds, $N_A$ and $N_B$, and torques, $T_A$ and $T_B$, are substituted for power $P_A$ and $P_B$. This includes an assumption that motor and inverter losses can be mathematically modeled as a quadratic equation based upon torque.

$$P_{BAT} = (N_A T_A + (a_1(N_A) \, T_A^2 + a_2(N_A) \, T_A + a_3(N_A))) + (N_B T_B + (b_1(N_B) \, T_B^2 + b_2(N_B) \, T_B + b_3(N_B))) + P_{DC\_LOAD} \quad [5]$$

wherein:

$N_A$, $N_B$ comprise speeds of Motors A, B;
$T_A$, $T_B$ comprise torques of Motors A, B; and,
$a_1$, $a_2$, $a_3$, $b_1$, $b_2$, $b_3$ each comprise quadratic coefficients which are a function of respective motor speeds, $N_A$, $N_B$.

This can be restated as Eq. 6:

$$P_{BAT} = a_1 * T_A^2 + (N_A + a_2) * T_A + b_1 * T_B^2 + (N_B + b_2) * T_B + a3 + b3 + P_{BAT\_DC\_LOAD} \quad [6]$$

This reduces to Eq. 7:

$$P_{BAT} = a_1[T_A^2 + T_A(N_A+a_2)/a_1 + ((N_A+a_2)/2*a_1)^2] + b_1[T_B^2 + T_B(N_B+b_2)/b_1 + ((N_B+b_2)/2*b_1)^2] + a3 + b3 + P_{BAT\_DC\_LOAD} - (N_A+a_2)^2/(4*a_1) - (N_B+b_2)^2/(4*b_1) \quad [7]$$

This reduces to Eq. 8:

$$P_{BAT} = a_1[T_A + (N_A+a_2)/(2*a_1)]^2 + b_1[T_B + (N_B+b_2)/(2*b_1)]^2 + a_3 + b_3 + P_{BAT\_DC\_LOAD} - (N_A+a_2)^2/(4*a_1) - (N_B+b_2)^2/(4*b_1) \quad [8]$$

This reduces to Eq. 9:

$$P_{BAT} = [SQRT(a_1)*T_A + (N_A+a_2)/(2*SQRT(a_1))]^2 + [SQRT(b_1)*T_B + (N_B+b_2)/(2*SQRT(b_1))]2 + a_3 + b_3 + P_{BAT\_DC\_LOAD} - (N_A+a_2)^2/(4*a_1) - (N_B+b_2)^2/(4*b_1) \quad [9]$$

This reduces to Eq. 10:

$$P_{BAT} = (A_1*T_A+A_2)^2 + (B_1*T_B+B_2)^2 + C \quad [10]$$

Wherein:

$A_1 = SQRT(a_1)$
$B_1 = SQRT(b_1)$
$A2 = (N_A+a_2)/(2*SQRT(a_1))$
$B2 = (N_B+b_2)/(2*SQRT(b_1))$
$C = a_3 + b_3 + P_{BAT\_DC\_LOAD} - (N_A+a_2)^2/(4*a_1) - (N_B+b_2)^2/(4*b_1)$

And, further reduceable to Eq. 11 and 12, below:

$$PBAT = (Tx^2 + Ty^2) + C \quad [11]$$

$$P_{BAT} = R^2 + C \quad [12]$$

Eq. 12 yields the transformation of motor torque, $T_A$ to $T_X$ and a transformation of motor torque $T_B$ to $T_Y$. The vector defined by $T_X/T_Y$ comprises battery power, $P_{BAT}$. Therefore, maximum and minimum battery power, $P_{BAT\_MAX}$, and $P_{BAT\_MIN}$ can be calculated and graphed as radii, Rmax 124, and Rmin 122, with a center at locus (0,0) in transformed space Tx/Ty, as shown with reference to FIG. 3. Minimum and maximum battery power, $P_{BAT\_MIN}$ and $P_{BAT\_MAX}$, are preferably correlated to various conditions, e.g. state of charge, temperature, voltage and usage (amp-hour/hour). The parameter C, above, is defined as the absolute minimum possible battery power at given speeds, $N_A$, $N_B$, ignoring motor torque limits.

Torque values Ta and Tb are transformable to Tx and Ty, as in Eq. 13:

$$\begin{bmatrix} T_X \\ T_Y \end{bmatrix} = \begin{bmatrix} A1 & 0 \\ 0 & B1 \end{bmatrix} * \begin{bmatrix} T_A \\ T_B \end{bmatrix} + \begin{bmatrix} A2 \\ B2 \end{bmatrix} \quad [13]$$

wherein

Tx is the transformation of $T_A$;
Ty is the transformation of $T_B$; and,
A1, A2, B1, B2 comprise scalar values.

The transformed vector [Tx/Ty] determined in Eq. 9 is solved simultaneously with the torque space identified by $R_{MIN}$ 122 and $R_{MAX}$ 124, to identify motor torques that are common to the first operating space and the second operating space, in Tx/Ty space. The outcome of the solution is shown with reference again to FIG. 3, wherein points A, B, C, D, and E represent the bounds for the common motor torques, in Tx/Ty space. The various points are defined as:

| Point | TX | TY | Radius or Line |
|---|---|---|---|
| A | $TX^A$ | $TY^A$ | Line |
| B | $TX^B$ | $TY^B$ | Rmax |
| C | $TX^C$ | $TY^C$ | Line |
| D | $TX^D$ | $TY^D$ | Rmin |
| E | $TX^E$ | $TY^E$ | Line |

Because the equations are executed as algorithms in Tx/Ty space, the execution time is effectively a single controller loop cycle, which can be in the range of 12 milliseconds or less.

The resultant equations for common motor torques [Tx/Ty], defined by points A, B, C, D, E are transformed again, to torques $T_A$, $T_B$ of Motors A and B, calculable as follows in Eq. 14:

$$\begin{bmatrix} T_A \\ T_B \end{bmatrix} = \begin{bmatrix} 1/A1 & 0 \\ 0 & 1/B1 \end{bmatrix} * \begin{bmatrix} T_X \\ T_Y \end{bmatrix} + \begin{bmatrix} -A2/A1 \\ -B2/B2 \end{bmatrix} \quad [14]$$

The control system is operable to control operation of the transmission system within the constraints of the range of operating points defined thusly. The algorithms constructed to implement the equations described hereinabove are preferably regularly executed during one of the aforementioned loop cycles to determine operating constraints of the electrical motors A and B.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture comprising: a storage medium having a computer program encoded therein for effecting a method to determine a preferred operating range for a plurality of torque-generative devices, each torque-generative device operable to provide motive torque to a torque transmission device, said program comprising:
   code for defining a first operating range in a first operating space;
   code for defining a second operating range in the first operating space;
   code for transforming the first operating range and the second operating range to a second operating space; and,
   code for defining the preferred operating range in the second operating space based upon the transformed first operating range and the transformed second operating range.

2. The article of manufacture of claim 1, wherein the code for defining the first operating range comprises code for defining the first operating range based upon torque output for each of the torque-generative devices.

3. The article of manufacture of claim 1, wherein the code for defining the second operating range comprises code for defining the second operating range based upon output of an electrical energy storage device operable to provide electrical energy to each of the torque-generative devices.

4. The article of manufacture of claim 3, wherein the code for defining the operating range based upon output of the electrical energy storage device further comprises code for limiting electrical energy transmission to the electrical energy storage system to limit charging of the electrical energy storage device.

5. The article of manufacture of claim 3, wherein the code defining the operating range based upon electrical energy system constraints further comprises code for limiting electrical energy transmission from the electrical energy storage system to limit discharging of the electrical energy storage device.

6. The article of manufacture of claim 1, wherein the code for transforming the first operating range and the second operating range to the second operating space comprises code for linearly transforming the first operating range and the second operating range from a radial dimension to an XY dimension.

7. The article of manufacture of claim 1, further comprising: code for retransforming the defined preferred operating range to the first operating space.

8. The article of manufacture of claim 1, wherein the computer program encoded for effecting the method to determine the preferred operating range for the plurality of torque-generative devices is executed during a cycle time less than about twelve milliseconds.

9. The article of manufacture of claim 1, wherein the torque-generative devices comprise a pair of electrical machines.

10. The article of manufacture of claim 9, wherein the torque transmission device comprises a two-mode compound split hybrid electro-mechanical transmission.

11. The article of manufacture of claim 10, wherein the two-mode compound split hybrid electro-mechanical transmission is operable to transmit motive torque to a driveline of a vehicle.

12. Method to determine a preferred operating range for a plurality of torque-generative devices, each torque-generative device operable to provide motive torque to a torque transmission device, comprising:
   defining a first operating range in a first operating space;
   defining a second operating range in the first operating space;
   transforming the first operating range and the second operating range to a second operating space; and,
   defining the preferred operating range in the second operating space based upon the transformed first operating range and the transformed second operating range.

13. The method of claim 12, wherein defining the first operating range comprises defining an operating range based upon torque output for each of the torque-generative devices.

14. The method of claim 12, wherein defining the second operating range comprises defining an operating range based upon output of an electrical energy storage device operable to provide electrical energy to each of the torque-generative devices.

15. The method of claim 14, wherein defining the operating range based upon output of the electrical energy storage device further comprises limiting electrical energy transmission to the electrical energy storage system to limit charging of the electrical energy storage.

16. The method of claim 14, wherein defining the operating range based upon electrical energy system constraints further comprises limiting electrical energy transmission from the electrical energy storage system to limit discharging of the electrical energy storage device.

17. The method of claim 12, wherein transforming the first operating range and the second operating range to the second operating space comprises linearly transforming the first operating range and the second operating range from a radial dimension to an XY dimension.

18. The method of claim 12, further comprising: retransforming the defined preferred operating range to the first operating space.

19. Control system for a powertrain comprising an internal combustion engine and a pair of electrical machines operably coupled to a two-mode compound-split electromechanical transmission, comprising:
   a plurality of electronic controllers signally interconnected via a local area network and operable to control the engine and the transmission based upon operator inputs determinable via a user interface;
   the control system including a storage medium having a computer program encoded therein operable to determine a preferred operating range for each of the electrical machines, said program comprising:
   code for defining a first operating range in a first operating space;
   code for defining a second operating range in the first operating space;
   code for transforming the first operating range and the second operating range to a second operating space; and,
   code for defining the preferred operating range in the second operating space based upon the transformed first operating range and the transformed second operating range.

20. The control system of claim 19, further comprising: code for retransforming the defined preferred operating range to the first operating space.

* * * * *